(12) United States Patent
Schmidt et al.

(10) Patent No.: US 10,686,984 B1
(45) Date of Patent: Jun. 16, 2020

(54) CONNECTED CAMERA SYSTEM

(71) Applicant: Waylens, Inc., Boston, MA (US)

(72) Inventors: Michael Frank Schmidt, Boston, MA (US); Dawei Shen, Brookline, MA (US); Haowei Zhang, Wayland, MA (US); Stephen E. Gordon, Lexington, MA (US); Shelby Lee Johnson, Allston, MA (US)

(73) Assignee: Waylens, Inc., Boston, MA (US)

( * ) Notice: Subject to any disclaimer, the term of this patent is extended or adjusted under 35 U.S.C. 154(b) by 419 days.

(21) Appl. No.: 15/044,404

(22) Filed: Feb. 16, 2016

Related U.S. Application Data

(60) Provisional application No. 62/116,281, filed on Feb. 13, 2015.

(51) Int. Cl.
  *H04N 5/232* (2006.01)
  *G11B 27/031* (2006.01)
  *H04N 5/225* (2006.01)

(52) U.S. Cl.
  CPC ....... *H04N 5/23238* (2013.01); *G11B 27/031* (2013.01); *H04N 5/2252* (2013.01); *H04N 5/2257* (2013.01); *H04N 5/23203* (2013.01)

(58) Field of Classification Search
  CPC .................................................. H04N 5/23238
  (Continued)

(56) References Cited

U.S. PATENT DOCUMENTS

D441,000 S   4/2001 Vanderwilt et al.
D484,160 S  12/2003 Kangasmaa
(Continued)

OTHER PUBLICATIONS

Reisinger, D., Auto Tech, Verizon launches Hum, a smart device for your dumb car, http://www.cnetcom/roadshow/news/verizon-launches-hum-a-smart-co; Aug. 26, 2015 (6 pages).
(Continued)

*Primary Examiner* — Eileen M Adams
*Assistant Examiner* — Daniel T Tekle
(74) *Attorney, Agent, or Firm* — Wood Herron & Evans LLP

(57) ABSTRACT

A connected camera system and computer-implemented method for processing visual data. The camera system and method provides control data to a mobile application of a mobile device. The camera system and method transmits the control data from the mobile device (via a cloud service) to a camera device. The camera device configured with a camera housing comprising a camera sensor that captures visual data (e.g., image or video data) in view of a lens. The camera device further configured with a processor coupled to a motor for rotating a shaft. The camera system and method receive the control data, and based on the control data, the processor controls the motor to rotate the shaft. The rotating of the shaft, in turn, rotates the camera housing, such that the camera sensor captures the visual data in view of the lens through a 360-degree plane of rotation. In some embodiments, the camera system and method further displays the visual data on a display coupled to the processor, such that the processor presents the captured visual data on the display through the 360-degree plane of rotation. In other embodiments, the camera system and method streams the captured visual data, via the cloud service, to the mobile device for viewing and editing.

20 Claims, 11 Drawing Sheets

(58) Field of Classification Search
USPC .......................................................... 348/36
See application file for complete search history.

(56) References Cited

U.S. PATENT DOCUMENTS

| | | | |
|---|---|---|---|
| D524,835 S | | 7/2006 | Barman et al. |
| D593,883 S | | 6/2009 | Hol et al. |
| D618,147 S | | 6/2010 | Bellingham |
| D673,988 S | | 1/2013 | Riegl et al. |
| D721,753 S | | 1/2015 | Park et al. |
| D734,801 S | | 7/2015 | Yang |
| D747,390 S | | 1/2016 | Roth et al. |
| D753,750 S | | 4/2016 | Coward |
| D754,235 S | | 4/2016 | Fish, Jr. et al. |
| 2002/0003571 | A1 | 1/2002 | Schofield et al. |
| 2006/0041908 | A1 | 2/2006 | Kim et al. |
| 2008/0070623 | A1* | 3/2008 | Ogawa ............... H04N 5/232 455/556.1 |
| 2009/0299572 | A1 | 12/2009 | Fujikawa et al. |
| 2010/0129070 | A1 | 5/2010 | Balasundaramohan et al. |
| 2012/0327234 | A1 | 12/2012 | Fish, Jr. et al. |
| 2014/0258854 | A1 | 9/2014 | Li |
| 2014/0313341 | A1* | 10/2014 | Stribling ................ H04L 67/02 348/157 |
| 2015/0334257 | A1 | 11/2015 | Woods et al. |
| 2016/0139793 | A1 | 5/2016 | Kish et al. |
| 2016/0332562 | A1 | 11/2016 | Kim |

OTHER PUBLICATIONS

Ambarella, S2L IP Camera Processor, Product Brief, printed Mar. 14, 2017 ( 2 pages).
Asghar, MN, et al, Video Indexing: A Survey, International Journal of Computer and Information Technology (ISSN: 2279-0764) vol. 03—Issue 01, Jan. 2014 (22 pages).
Wikipedia, On-board diagnostics, https://en.wikipedia.org/wiki/On-board_diagnostics, printed Mar. 14, 2017 (11 pages).
Micron Technology, Inc.—Choosing the Right NAND, https://www.micron.com/products/nand-flash/choosing-the-right-nand , printed Mar. 23, 2017 (3 pages).
Wikipedia, Microelectromechanical systems, https://en.wikipedia.org/wiki/Microelectromechanical_systems#Applications printed Mar. 23, 2017 (11 pages).
Wikipedia, High-definition video, https://en.wikipedia.org/wiki/High-definition_video printed Mar. 13, 2017, (7 pages).
LSI Logic Corporation, H-264/MPEG-4 AVC, Video Compression Tutorial, Jan. 2003, (8 pages).
Unanue I., et al., A Tutorial on H.264/SVC Scalable Video Coding and its Tradeoff between Quality, Coding Efficiency and Performance, www.intechopen,com, (25 pages).
Sethuraman, S., Tutorial: The H.264 Advanced Video Compression Standard, Ittiam Systems (Pvt.) Ltd., IEEE Multimedia Compression Workshop, Oct. 27, 2005 (68 pages).
Wikipedia, H.264/MPEG-4 AVC, https://en.wikipedia.org/wiki/H.264/MPEG-4_AVC; printed Mar. 13, 2017 (14 pages).
Camera Hacker, Flash Memory Speed, http:/www.camerahacker.com/myink/ViewPage.php?file=docs/Flash, printed Mar. 23, 2017 (2 pages).
Cooke, J., Flash memory 101: An Introduction to NAND flash, EE|Times, http://www/eetimes.com/document.asp?doc_id= 1272118 Mar. 20, 2006 (4 pages).
CC2541 SimpleLink Bluetooth low energy and proprietary wireless MCU, http://www.ti.com/product/CC2541; printed Mar. 23, 2017 (5 pages).
Wikipedia, Boost gauge, https://en/wikipedia.org/wiki/Boost_gauge; Oct. 23, 2016, printed Mar. 14, 2017 (1 page).
An Overview of H.264 Advanced Video Coding, https://www.vcodex.com/an-overview-of-h264-advanced-video-coding/ printed Mar. 13, 2017 (5 pages).
Wikipedia, 1080p, https://en/wikipedia.org/wiki/1080p printed Mar. 13, 2017 (4 pages).
Display_resolutions (002).png—Photos.

* cited by examiner

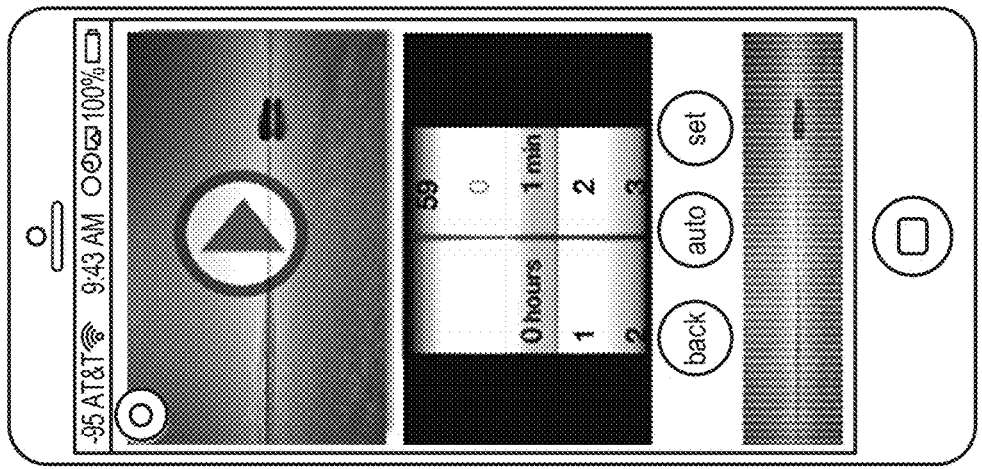
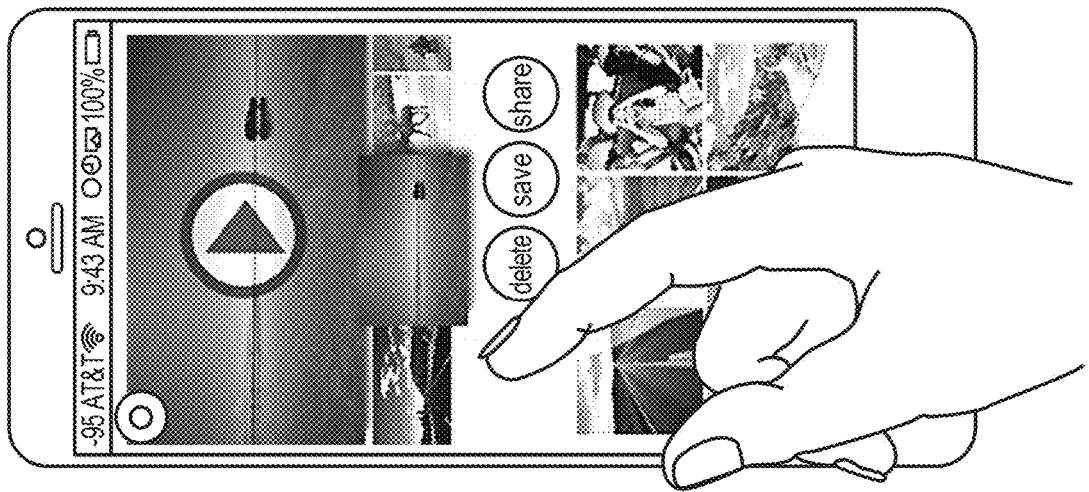
FIG. 5B

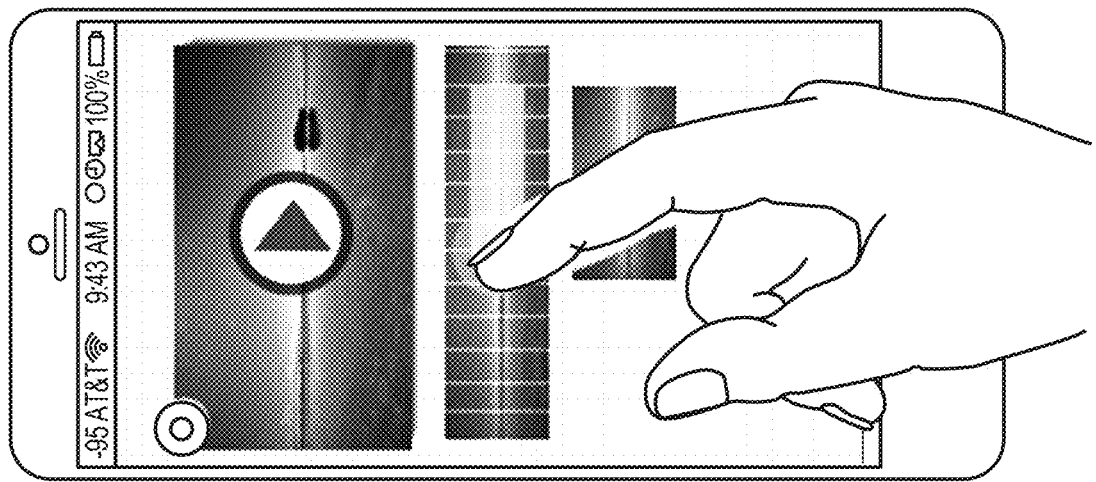
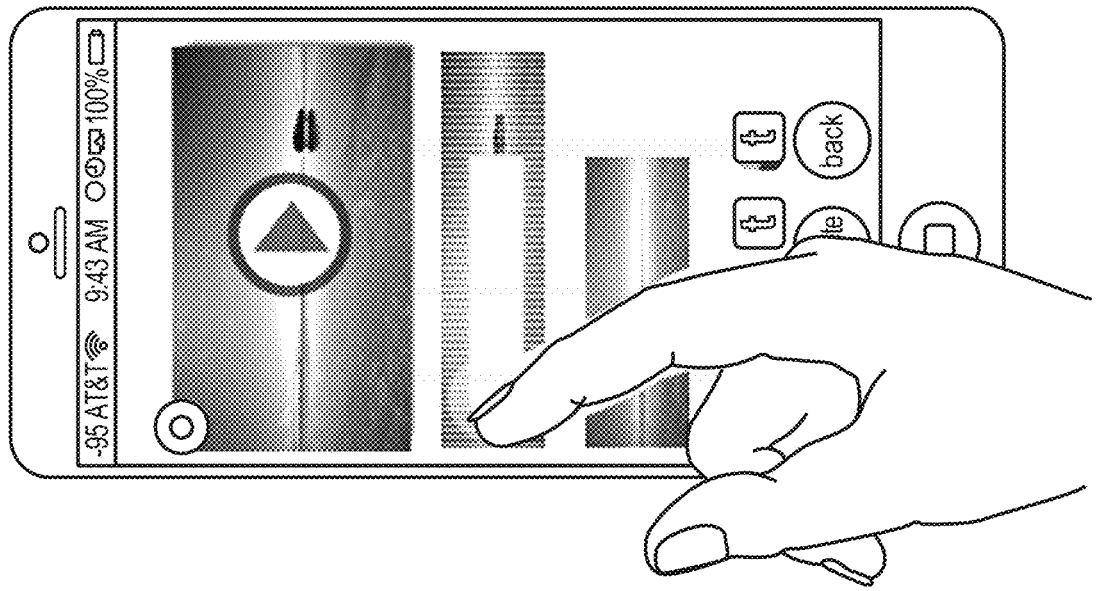
FIG. 5C

CONNECTED CAMERA SYSTEM

RELATED APPLICATION

This application claims the benefit of U.S. Provisional Application No. 62/116,281, filed on Feb. 13, 2015. The entire teachings of the above application are incorporated herein by reference.

BACKGROUND OF THE INVENTION

Conventional camera systems, such as GoPro, have a fixed field of view for capturing visual data (e.g., images, video, and such). In some conventional camera systems, in order to change the fixed field of view to provide a 360 degree view, the camera must be physically moved relative to its mounting system. In other conventional camera systems, the camera system is configured with multiple lenses, and the images/video captured from the respective fields of view of each lens must be stitched together to provide a 360 degree view. For these camera systems, the use of multiple lenses adds additional costs to the camera system and requires more complicated software to stitch together the images (pictures) and video streams. Note, security cameras provide a controllable field of view, but security camera systems do not provide a mobile interface (via a cloud infrastructure) for controlling, hosting, streaming, and editing captured images/video.

SUMMARY OF THE INVENTION

The present invention is directed to a stand-alone connected camera system that includes a multi-directional camera device with 360-degree plane of rotation. The connected camera system enables a user to wirelessly control the camera device from a mobile device (using a mobile application), either via a direct connection through a WiFi, or via a cloud infrastructure, for capturing visual data (e.g., images, video, and such). The system infrastructure further enables seamless editing of the captured data to be performed from the mobile application (on the mobile device) or a desktop application (on a desktop or laptop computer). The present invention includes, but is not limited to, a camera sensor and lens configured in a camera housing, which is mounted on a main housing (base) configured with a rotating motor, an OLED display, and wireless connectivity. The present invention further includes a mobile phone application to control the direction of the camera housing and camera (lens/sensors) functions from the mobile device (e.g., smartphone), and a dedicated remote control device to control the same without using a mobile device.

The present invention is directed to a connected camera system and computer-implemented method for processing visual data. The camera system and method enables a user to provide control data for a camera device using a mobile application of a mobile device. The camera system and method transmit the control data from the mobile device (either via direct WiFi connectivity or via a cloud service) to the camera device. The camera device is configured with a camera housing comprising a camera sensor that captures visual data in view of a lens. The visual data comprises at least one of image or video data. The camera device is further configured with a main housing including a processor coupled to a motor for rotating a shaft situated between the camera housing and the main housing.

The camera system and method receive the control data, and based on the control data, the processor may control the motor to rotate the shaft. The rotating of the shaft, in turn, rotates the camera housing, such that the camera sensor captures the visual data in view of the lens through a 360-degree plane of rotation. In some embodiments, the camera system and method further present the visual data on a display, such as an OLED display, coupled to the processor, such that the processor presents the current captured visual data (e.g., in real-time) on the display through the 360-degree plane of rotation. In other embodiments, the camera system and method stream the captured visual data, via the cloud service, to remote users for viewing on their mobile or desktop device. In some of these embodiments, the mobile device provides context-aware viewing of the streamed captured data, such as, but not limited to, location, speed, acceleration, absolute orientation of the camera.

In some example embodiments, the camera system and method also rotate the shaft based on conditions detected by one or more sensors coupled to the processor. The sensors include at least one of a GPS, accelerometer, automotive on board diagnostic connections (ODB II), G force sensor, and altimeter. In other example embodiments, the camera system and method rotate the shaft based on control data received from a dedicated remote control device (e.g., console device with at least one radial button). Further, the camera system and method bookmark, highlight, and edit at the mobile device, from the mobile device via the cloud service, at least one of the captured data presented on the camera device display or the streamed captured visual data at the mobile device. The camera system and method also provide, via the cloud service, smart time-lapse view generation and smart highlight video generation for editing the captured data presented on the camera device display or the streamed captured visual data at the mobile device.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

FIGS. 5A-5C are example mobile application interfaces used to edit captured visual data in embodiments of the present invention.

DETAILED DESCRIPTION OF THE INVENTION

A description of example embodiments of the invention follows.

Architecture of the Connected Camera System

Figure 1:
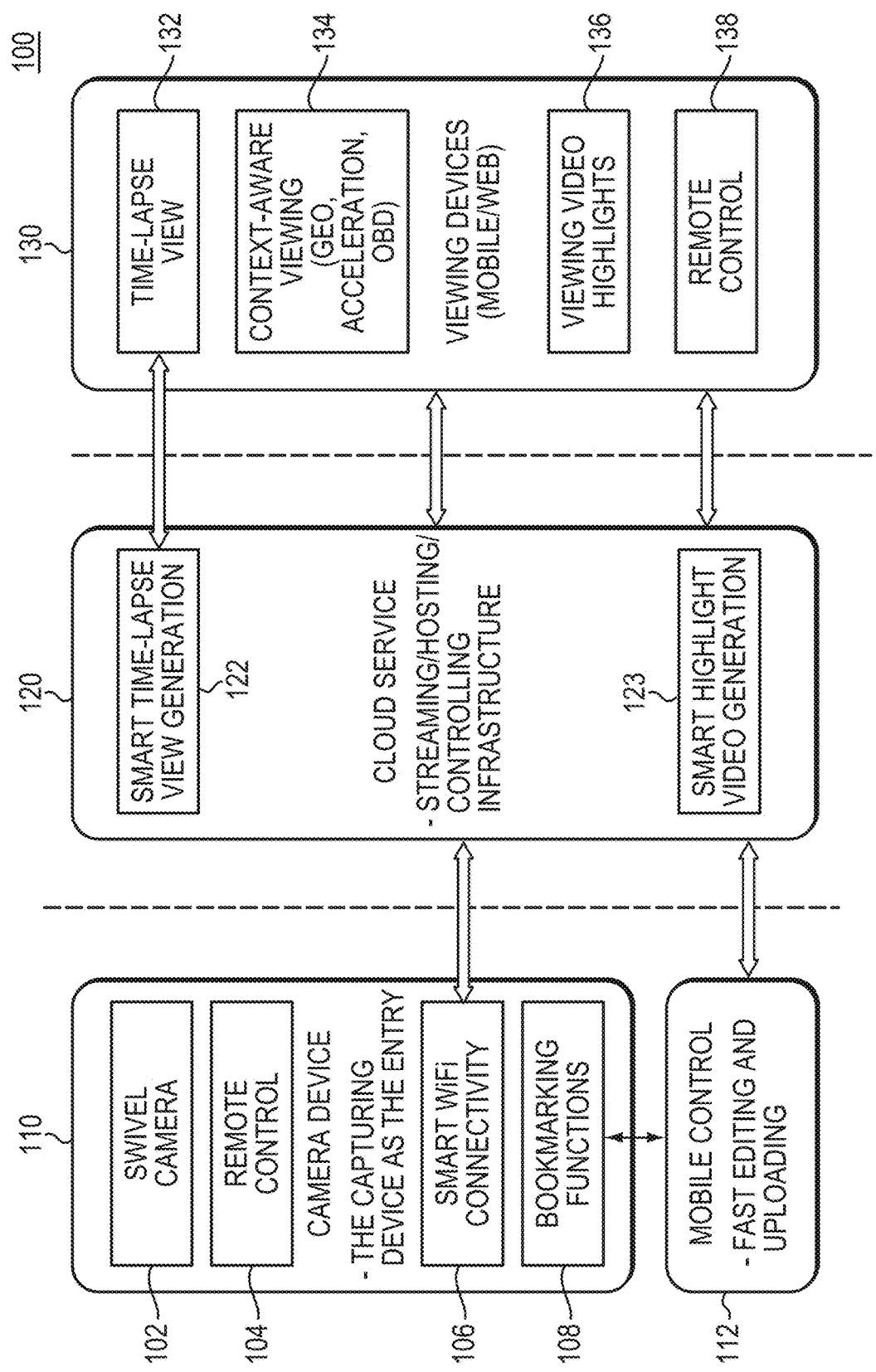
FIG. 1 is an architectural diagram of an example connected camera system in embodiments of the present invention.

FIG. 1 is an example architectural diagram of the connected camera system 100 of the present invention. In the embodiment of FIG. 1, the connected camera system 100 is organized into four system architecture components, the camera device 110, the cloud server 120, the viewing devices 130 (which communicates with the camera device 110 via the cloud service 120), and the controlling mobile device 112 (which directly communicates with the camera device 110 via WiFi connection 106). Note that the same mobile device 112 may serve as both a controlling device and a viewing device (of 130). The camera device 110 is configured with a swivel camera 102 (including camera hardware, such as a lens and sensor) for capturing and displaying visual data. The camera device 110 is further configured with a (dedicated) remote control interface 104 that may be used to control the swivel camera 110 via a remote control device (such as at 130,138 detailed later). The camera device 110 is also configured with a mobile control interface 112 that may be used for a user to control the camera device 110 with direct WiFi communications. The camera device 110 further includes bookmarking functions 108 for marking or highlighting segments of the captured visual data, as displayed on the swivel camera 110. The camera device 110 enables users to use the controlling mobile device 112 to perform the marking/highlighting functions 108.

The camera device 110 is further configured with smart WiFi connectivity 106, which is a communication interface used to communicate data between the camera device 110 and the cloud service 120, for finally reaching the viewing devices 130. For example, the smart WiFi connectivity 106 may transmit (e.g., stream) captured visual data to viewing devices 130, or receive control commands to control the swivel camera 110 from the viewing devices 130 and/or the mobile controlling device 112. The cloud service 120 of connected camera system 100 comprises a streaming, hosting, and controlling infrastructure for the connected camera system 100. The cloud service 120 includes hardware and software modules for automatically generating special views, such as time-lapse view generation 122, and smart highlight videos generation 123, of the captured data. Further, the viewing devices 130 (e.g., mobile phone, web browsers, and such) provide end-users a viewing, controlling, and editing experience in regard to the captured visual data from camera device 110 (via the cloud service 120). The viewing experiences at viewing devices 130 include viewing video highlights 136 (as generated and output by 123), context-aware viewing 134 (via geo, acceleration, ODB sensors), and time lapse viewing 132 (as generated and output by 122).

Viewing devices 130 may include a remote control interface 138 for controlling the swivel camera 110 via camera device interface 104.

Example Embodiments of Camera Devices

Figure 2:
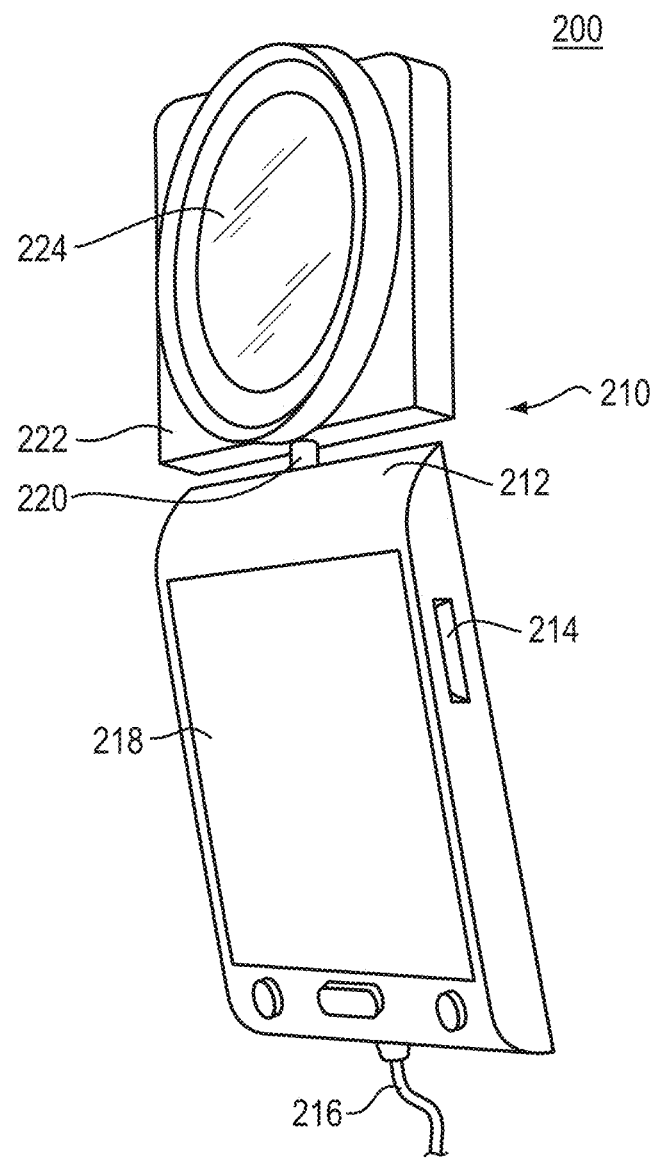
FIG. 2 is a perspective view of a camera system in an example embodiment of the present invention.
Figure 3A:
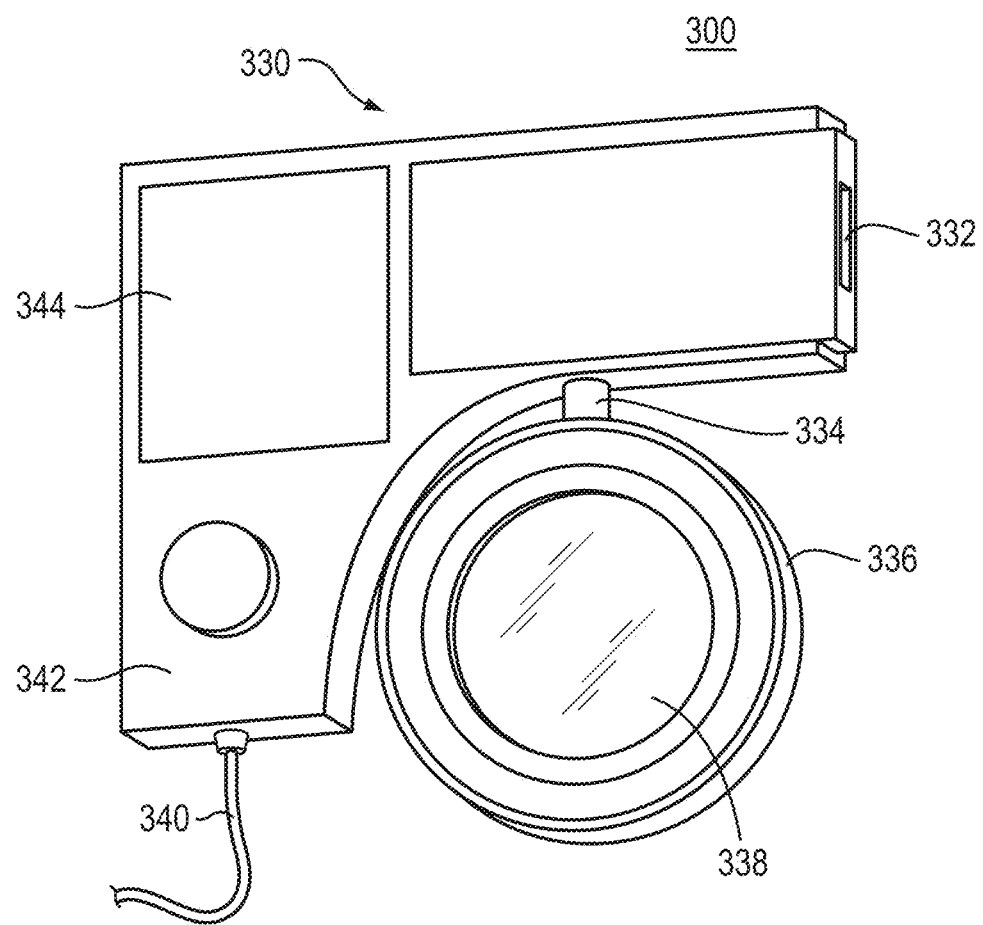
FIG. 3A is a perspective view of a camera system in an alternative example embodiment of the present invention of FIG. 2.

FIG. 2 is a perspective view of example camera device 200 in embodiments of the present invention, and FIG. 3A is a perspective view of example camera device 300 in alternative embodiments of the present invention. The camera devices 200, 300 may be made of metal or of any other sufficiently strong material, such as high-strength plastic, wood, and the like. Further, the various components of the camera devices 200, 300 be made of these and other materials.

Swivel Camera

The camera devices 200, 300 are embodiments of the camera device 110 of the connect camera system architecture 100 of FIG. 1. Both devices include a swivel camera 102 configured as a camera housing 222, 336. Specifically, the camera device 200 includes a camera housing 222 configured with a lens 224 for viewing visual data (e.g., images, video, and such), in the viewing angle of the lens 224, and an internal camera sensor (not shown) for capturing the viewed visual data. Similarly, camera device 300 includes a camera housing 336 configured with a lens 338 for viewing visual data, in the viewing angle of the lens 338, and an internal camera sensor (not shown) for capturing the viewed visual data. The lens 224, 338 may be configurable to a viewing angle of any degree (or other angle measurement), including, but not limited to, a 140 degree, 170 degree, or 180 degree viewing angle. The lens 224, 338 may be further configurable to be faced in any direction, rotated or remain stationary, detachable, such that the lens 224, 338 may be mounted in different locations on the camera systems 200, 300, and any other such configurations. The lens 224, 338 may also be configurable for adjusting the lens functions, such focus, exposure, lighting, and other such standard lens configurations.

In some embodiments, the camera housing 222, 336 may include multiple lenses 224, 338 for viewing the visual data, and in some embodiments the housing 222, 336 may include multiple camera sensors for capturing the viewed data. In the embodiments with multiple lenses 224, 338, some or all of the lenses 224, 338 may be configurable, individually or in groups, in the manners described above. In some embodiments of the camera systems 200, 300, the housing 222, 336 may also include infrared lighting, a visible light flash, or a combination of the both, for controlling light passing through the lens 224, 338. The housing 222, 336 may also include sensors programmed to rotate the lens 224, 338 based on detected lighting, such that when there is bright sunlight, the camera rotates from the direct sunlight to improve the image quality.

Motor

Both camera devices 200, 300 further include a main housing 212, 342 (i.e., base) for the camera housing 222, 336. Specifically, the main housing 212 of the camera system 200 is coupled to the camera housing 222 of the camera system 200 via a shaft 220. Similarly, the main housing 342 of the camera system 300 is coupled to the camera housing 336 via a shaft 334. The shaft 220, 334 may be rotated (or otherwise moved) by an internal motor (e.g., swivel motor) configured in the camera systems 200, 300. The motor may be any type of motor, including, but is not limited to, an alternating current (AC) induction or asynchronous (e.g., single phase, squirrel cage, wound rotor, variable reluctance, split phase, shaded pole, AC brushed, and the like), AC synchronous (e.g., sine wave, wound rotor, permanent magnet rotor, stepper, variable reluctance, brushless, and the like), direct current (DC) motors (e.g., universal, brushless, and the like). The motor may also be a combination of any of these motor types, as well as, any other type of motor not mentioned.

In some embodiments, the swivel motor may be configured in the main housing 212, 342 of the camera system 200, 300, and in other embodiments, the swivel motor may be configured in the camera housing 222, 336 of the camera system 200, 300. In yet other embodiments, the swivel motor may be configured in a separate mount for attaching the camera system 200, 300 (or components of the camera system 200, 300). For example, the camera housing 222, 336 and the main housing 212, 342 may be packaged as a single device, and the device attaches to a swivel mount (not shown) that includes the swivel motor (i.e., a motorized swivel mount) for rotating the camera housing 222, 336. In other embodiments of camera system 200, 300, the camera housing 222, 336 is detachable from main housing 212, 342, and the detached camera housing 222, 336 may be attached to various accessory motorized swivel mounts. Further, some embodiments, these accessory motorized swivel mounts may include multiple adapters for attaching the motorized swivel mount to various surfaces, including, but not limited to, glass, dashboard, table, and such. The motorized swivel mount and attached camera housing 222, 336 configurations include a connection for transferring power to the camera and commands to the swivel motor via the power cord 216, 340.

As the swivel motor rotates (or otherwise moves) the shaft 220, 334, in turn, rotates (moves) the camera housing 222, 336 configured with the camera sensor and lens 224, 338 while the main housing 212, 342 (including the displays 218, 332, 344) remains stationary. The motor may rotate the camera housing 222, 336 in any degree plane of rotation, including a 360 degree plane of rotation. As the shaft rotates the camera housing 222, 336, the field of view of the lens 224, 338 changes, such that the lens 224, 338 views changing visual data, in the changing viewing angle of the lens 224, 338, and the camera sensor captures the changing viewed visual data (e.g., in a standard digital or other electronic format). In this way, the camera sensors may capture visual data in any degree plane of rotation, including a 360-degree plane of rotation Computer Processors and Memory The main housing 212 of the camera system 200 is also configured with a power cord 216 and a battery 214, to supply power when the power cord 216 is not connected to a power supply. Note, the camera devices 200 draws power from replaceable and potentially rechargeable batteries, 12 V DC power, or 100-240V 50/60 Hz AC power, and a power circuit that converts AC to DC power. The main housing 342 of the camera system 300 is also configured with a power cord 340.

The main housing 212, 342 is further configured, internally (not shown) with one or more computer processors and computer memory. In some embodiments, the camera housing 222, 336, along with the main housing 212, 342, is also configured with one or more computer processors and computer memory. Note that the electronics of the processing fabric (including the one or more processors) of camera system 200, 300 consists of a power circuit, video encoder, main controller unit, and wireless controller. In example embodiments, all electronics will be grouped onto one printed circuit board. In other example embodiments, each of these circuits may be configured on an individual boards or grouped on a single board of two or more of these circuits, depending on the layout that is necessary to fit the electronics into the available space of the industrial design of the camera systems 200, 300. The computer memory may be any removable or permanently fixed internal memory, or any combination therein, coupled to the processor fabric, such as a secure digital (SD) card, to store (record) data, including captured visual data from the camera sensor of the camera housing 222, 336.

The one or more computer processors are configured to control the swivel motor, along with the lens 224, 338 and camera sensors, based on control data received from a controller device, as disclosed later in this document. The control data may include commands for controlling (e.g., in real-time): the lens 224, 338, such as controlling its direction, viewing angle, focus, exposure; the camera sensor, such as controlling its timing of capturing of the visual data; or any other component of the camera system 200, 300, such as motor rotating the swivel shaft 220, 334. For example, based on the control data, the one or more processors may change the viewing angle within a 360-degree field of view with respect to the current view provided by the camera sensor. The control data may also include commands for programming control data (in computer memory) at the camera system 200, 300 such as programming rotation at specific intervals, speeds, and such, and the one or more processors control the camera system 200, 300 based on the programmed commands. For example, the programmed rotation may include, but is not limited to, rotating the camera housing 222, 336 by 360-degrees every hour at a rate of 360-degrees per minute.

The one or more computer processors are further configured to control the swivel motor, along with the lens 224, 338 and camera sensors, in response to conditions detected by sensors configured internal to the main housing 212, 342, camera housing 222, 336, or other components of the camera system 200, 300. These sensors may include one or more of a: GPS, accelerometer, automotive on board diagnostic connections (ODB II), G force sensor, altimeter, and the like.

The following is a non-limiting example code for the one or more processors (CPU) to control the direction of the swivel camera movement from controller inputs. The sample code below does not include all above-described features of the camera systems 200, 300.

```
//Controlling the Motor
  //PWM Input of 180 will turn the motor clockwise
  //PWM Input of 200 will turn the motor counterclock-
      wise
  //PWM Input of 0 will stop the motor
  int motorPin=10;
  int cwButton=7;
  int ccwButton=6;
  int vat=0;
  int count=0;
  boolean delayBool=true;
  void setup( ) {
    pinMode(motorPin, OUTPUT);
    pinMode(cwButton, INPUT_PULLUP);
    pinMode(ccwButton, INPUT_PULLUP);
  }
  void loop( ) {
    //The following while loop creates a stepper function
    /*while (!delayBool) {
      delay(500);
      delayBool=true;
    }*/
    if (digitalRead(cwButton)==LOW && digitalRead
        (ccwButton)==HIGH && delayBool) {
      //This is a manual pulse-width modulation
      //1.3 ms HIGH and 20 ms LOW is the fastest
          counter clockwise
```

```
//The motor is centered around 1.5 ms HIGH pulse
    width: NO MOTION
    digitalWrite(motorPin, HIGH);
    delayMicroseconds(1300);
    digitalWrite(motorPin, LOW);
    delayMicroseconds(20000);
    //The following boolean is used with the stepper
        function
    //delayBool=false;
}
else if (digitalRead(ccwButton)==LOW && digital-
    Read(cwButton)==HIGH && delayBool) {
    //This is a manual pulse-width modulation
    //1.7 ms HIGH and 20 ms LOW is the fastest
        clockwise
    digitalWrite(motorPin, HIGH);
    delayMicroseconds(1700);
    digitalWrite(motorPin, LOW);
    delayMicroseconds(20000);
    //The following boolean is used with the stepper
        function
    //delayBool=false;
}
else {
    //If no button is pressed, do not spin the motor
    analogWrite(motorPin, 0);
}
}
```

The one or more computer processors are also configured to perform other functions related to the camera devices 200, 300. For example, the one or more processors are configured to store (record), and, later load, the captured visual data at the computer memory. The one or more processors are further configured to process the captured visual data, including editing, highlighting, marking, and such, the captured data based on input provided from the viewing devices 130 of FIG. 1 (e.g., mobile devices, multimedia devices, desktop devices, and such) as described in more details later in this document. The one or more processors are also configured to transmit (e.g., stream) the captured visual data to the viewing devices 130 for processing and displaying. The one or more processors are also configured to receive (e.g., stream) other data from the viewing devices, and other local and remote devices, for processing and displaying, such as receiving real-time streaming video of friends and followers watching the captured visual data being streamed, by the one or more processors, simultaneously, to the viewing devices 130.

The one or more processors transmit/receive the data via a wired connection, or the WiFi connectivity component 106 of the camera device architecture 100 (FIG. 1), described in more details later in this document. The one or more processors may similar transmit/receive data (including the captured visual data) between the main housing 212, 342 and the camera housing 222, 336, including in embodiments in which the camera housing 222, 336 is detached from the main housing 212, 342 (e.g., positioned on a motorized swivel mount).

Camera Display

The main housing 212 of camera system 200 is further configured with a display 218, and the main housing 342 of camera system 300 is further configured with a primary display 332 and one or more secondary displays 344. In some embodiments, the display 218, 332, 334 is an OLED display, and, in other embodiments, the display 218, 332, 334 may be any other type of computer display known in the art. The one or more processors of the camera system 200, 300 present visual data on the display 218, 332, 344. The presented visual data may include, but is not limited to, current visual data (e.g., in real-time) captured by the camera sensor of the camera housing 222, 336, previously recorded captured visual data stored in the computer memory, or other visual data received from local or remote device (e.g., viewing devices 130 of FIG. 1) via a wired connection, or the WiFi connectivity component 106 of the camera device architecture 100 described in more details later in this document. For example, the one or more processors may present the captured visual data, in real-time, on display 218, 332, 344 to allow one or more users to continuously see what the camera sensor is capturing as the camera housing 222, 336 rotates 360 degrees. The camera system 300 may present any combination of this visual data on its multiple displays (i.e., primary display 332 and the one or more secondary displays 344). The presented visual data on the displays 218, 332, 344 may be bookmarked, highlighted, edited or otherwise manipulated by a user, as described in more details later in this document.

Note, the camera system 200, 300 may be mounted in any orientation and configured with a sensor, such as an accelerometer configured internal to the main housing 212, 342, camera housing 222, 336, or other component of the camera system 200, 300. The sensor detects the orientation of the camera system and communicates the orientation to the one or more processors. In some embodiments, when the sensor detects a change in orientation of the camera system 200, 300, the one or more processors automatically adjust the presented visual data to remain in a horizontal direction on the display 218, 332, 344. In other embodiments, when the sensor detects a change in orientation of the camera system 200, 300, the one or more processors may automatically adjust the presented visual data in any other direction (e.g., vertical) on the display 218, 332, 344, or the visual data may not be adjusted in a direction on the display 218, 332, 344.

Remote Control

Figure 3B:
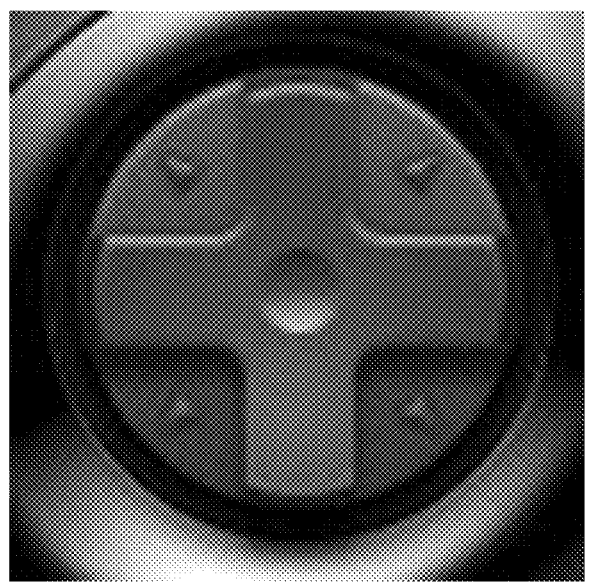
FIG. 3B is an example radial button control on remote control devices in embodiments of the present invention.

The one or more processors of the camera device 200, 300 may receive control data from various remote control devices for controlling the camera devices 200, 300. As shown in FIG. 1, the camera device 110 (camera devices 200, 300 are embodiments thereof) of the connected camera system 100 includes a remote control interface 104, 210, 330. A remote control device (e.g., a remote control console or other controller device) may be configured to control the camera devices 200, 300 via this dedicated remote control interface 104, 210, 330. The remote control device is configured with various input controls, including, but not limited to, one or more radial buttons as shown in FIG. 3B. A radial button, for example, may be configured to transmit a signal to the remote control interface 104, 210, 330 to rotate the camera housing 222, 236. The radial button may also be configured to transmit a signal to otherwise control the lens of the camera house 222, 236, by, for example, changing the viewing angle of the lens, or by, for example, controlling the capturing of the viewed visual data by the sensor of the camera house 222, 236. A radial button, or other input control on the remote control device, may also be configured to control the captured visual data presented on the display 218, 332, 344. For example, the input control may send a signal to the processor to present a menu, or other visual option, on the display for controlling the camera devices 200, 300. The remote control may be battery powered, powered by a connection cable, or a combination of both. In other embodiments, the remote device may be a remote control, which enables the user to specify various configurations for the camera system 200, 300.

A viewing device 130 (e.g., mobile device, web device, or other such device connected through a local or remote network), may also be configured to control (as a remote control device) the camera devices 200, 300 via remote control interface 138 of the viewing devices 130 to the remote control interface 104, 210, 330 of the camera device 110. The viewing device 130 (e.g., mobile phone) may be configured with a mobile application, such as a native app or a web app, that enables the user to provide control data for controlling the camera system 200, 300. Specifically, the mobile application may provide a user interface for the user to specify various configurations for the camera system 200, 300, such as a direction for the one or more camera lenses 224, 338, a rotation for the camera housing 222, 336, change the viewing angle within a 360-degree field of view of the view set by the sensors, changing the functions (e.g. focus) of the lens 224, 338, and the like. The mobile application on the viewing device 130 generally 130) may be executed by a user near the camera system 200, 300, which transmits the specified configuration, from the viewing device 130, via the remote control interface 138, to the camera device 110, 200, 300 (via remote control interface 104, 210, 330), from which the one or more processors of the camera device 200, 300 receive/process the information as previously described. The mobile application may also be executed by a user at a remote location from the camera device 200, 300 such that the mobile application, on the viewing device 130, transmits the specified control data, via the cloud service 122, to the camera device 200, 300 or a remote server thereof (e.g., in the cloud). The one or more processors of the camera device 200, 300 receive or retrieve the specified configuration, directly or from the remote server via mobile control interface 112 by means of WiFi Connectivity 106.

The viewing device 130 may also be other devices for controlling the camera device 200, 300. For example, the viewing device 130 may be a smart watch application or another wearable device that includes a sensor (e.g., accelerometer) that tracks the direction of a user's head. That is, as the wearable device user rotates his head, the wearable device transmits the sensor measurements to the camera device 200, 300, and the one or more processors of the camera device controls the direction of the camera lens 224, 338 based on the measurements, such that the camera lens 224, 338 rotates in the same direction. The application of the wearable technology described above includes, but is not limited to, an automobile driver in a vehicle, such that the camera on board the vehicle records the visual data in the viewing direction of the driver. Similarly, the camera system 200, 300 includes, but is not limited to, displaying a live stream of video to a remote user who is wearing a virtual reality headset, such as, but not limited to, an Oculus headset. As the remote user rotates his head, the direction of the camera lens 224, 338 of the camera device 200, 300 rotates in the same direction, giving the remote user a virtual reality experience of being in the location of the camera view.

WiFi Connectivity

The camera device 110, 200, 300 of connect camera system 100 includes a smart WiFi connectivity 106 for enabling the camera device 200, 300 to directly connect with WiFi providers and gain Internet access, even when connecting to such WiFi access points requires authorization, answering challenges, and other complex user interactions beyond entering a pair of Service Set Identifier (SSID) and password. Connecting the camera device 110, 200, 300 with a WiFi access point (AP) may be extremely challenging because such a camera device 110, 200, 300 often lacks a sufficiently large display and input device, such as a keyboard, to input SSID and password information of an access point. Connecting the camera device 110, 200, 300 is even more challenging when the access point challenges the connecting device with information beyond SSID and password information, as the camera device 110, 200, 300 does not have the interface to view the challenge nor the input mechanism to provide the information to resolve the challenge. Thus a smart WiFi connectivity 106 provides the camera device 200, 300 with the capability of acquiring WiFi connectivity from public and private WiFi providers when users need enough bandwidth and speed for uploading large amounts of video and sensory data that cannot be sufficiently met by cellular connection. The smart WiFi connectivity 106 consists of both hardware and software modules. A dual-role component, which could be implemented by, but not limited to, a TI WiLink 8 module, is the key hardware component. This component serves the role of a station connecting to the Internet via an existing access point; and further serves the role of an access point providing connectivity to other devices such as users' mobile phones. The camera device 110, 200, 300 and the controlling device 112 can be easily connected by a direct WiFi connection, in which the camera device 110, 200, 300 itself serves as an access point, and the mobile device 112 serves as a client. This connection setup is the most common scenario when operating the camera through the mobile device 112 (e.g., viewing device 130). Any challenges, including authentication requests and others, received by the dual-role device are forwarded to a connected device such as the controlling devices 112 (e.g., mobile phone), and could be resolved through the interface of the controlling devices 112, thus, gaining access to the Internet. The software modules are primarily implemented through a mobile interface, which both instructs the hardware device on how to establish a connection to an existing access point, and respond to any forwarded challenges. The main goal of the WiFi connectivity process, is, therefore, to ensure that the camera device 110, 200, 300, in its dual-role mode, and the controlling device 112 maintain direction connection, and the controlling device facilitates the camera device 110, 200, 300 to connect to an external access point to gain connectivity to Internet By architecting the smart WiFi connectivity 106 in this way, the need of using a mobile phone as a relay or temporary storage device, when transferring large data files to the cloud, is removed. Therefore, the smart WiFi connectivity 106 minimizes the number of steps users need to follow for completing such transfer. Such architecture of the connected camera system 100 successfully addresses a broader challenge, which is how to transfer large amounts of data from generic sensing devices to the cloud wirelessly when only WiFi could provide the required speed and bandwidth. This is addressed further by the WiFi connectivity 106 enabling communication via a wired connection, such as a data cable, or through a wireless connection, such as, but not limited to, infrared, 802.11 wireless communication, mobile phone networks, Bluetooth communication, Low Energy Bluetooth communication, unlicensed short range radio frequency according to the US FCC Code of Federal Regulations (CFR), Title 47, Part 15. The one or more processors are similarly communicatively coupled (via the same or different communication/connectivity interface) to remote networks (e.g., over the Internet) for transmitting/receiving data to/from remote devices (e.g., mobile devices, PCs, multimedia devices, and such). In some embodiments, the WiFi connectivity 106 includes a video encoder capable of simultaneously capturing multiple streams of video, including, but not limited to, HD video (1080p 60 fps), 720p video and time-lapse images.

Example Method for Configuring Camera Device

Figure 4A:
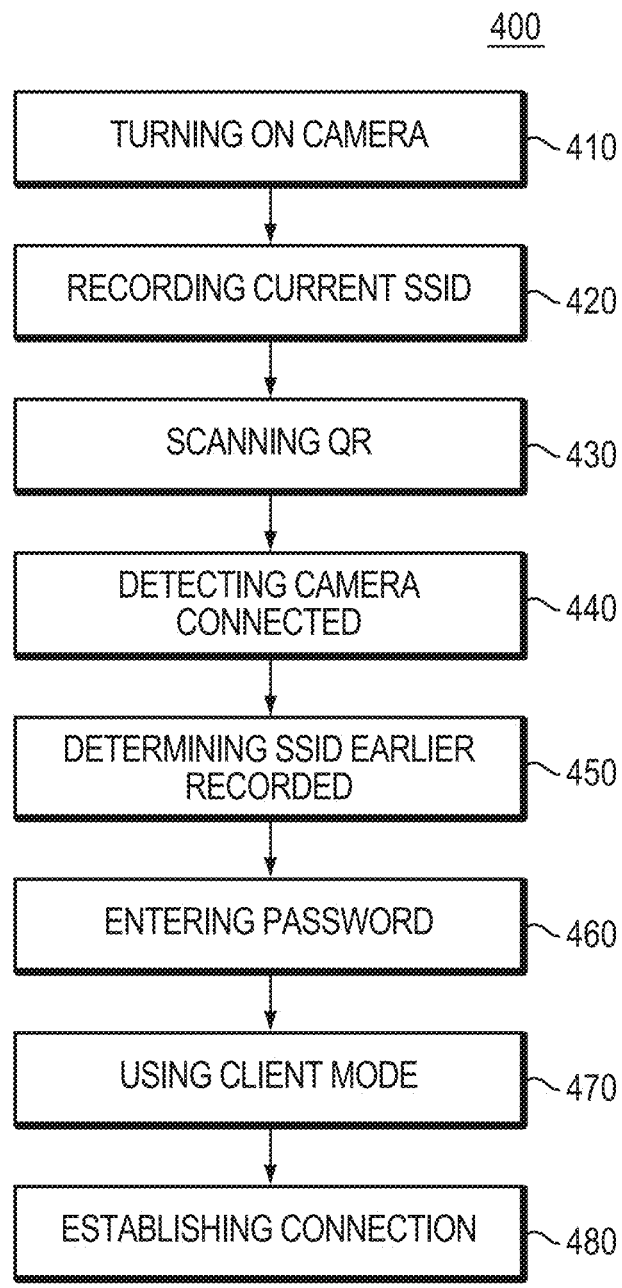
FIG. 4A is a flow diagram of an example method for setting up a camera device with WiFi connectivity in embodiments of the present invention.

FIG. 4A is an example method 400 for setting up a camera device with WiFi connectivity in embodiments of the present invention. Specifically, the following describes example steps for an iOS user when setting up the camera device 110, 200, 300 for the first time. Note that after the first-time setup, connecting the mobile device 112 (or viewing devices 130 in some embodiments) and the camera device 110, 200, 300 (i.e., the first step) should be done automatically since the mobile device 112, 130 generally remembers a past SSID/password that the mobile device 112, 130 connects to, and only the second step needs to be reconfigured for each different external WiFi access point.

At step 410 of method 400, the first part of the method begins, and the user turns on the camera device 110, 200, 300, and the camera device 110, 200, 300 displays (e.g., on display 218, 332, 344) a Quick Response (QR) code with SSID and password embedded for the camera's access point (AP). At this step, the camera device 110, 200, 300 has both client and AP mode enabled (i.e., is in its dual-mode). At step 420 of method 400, the iOS allows a mobile application executed at the mobile device 112 to know and record the current WiFi SSID. At the end of step 420 of method 400, the user may open the mobile application, if the mobile device 112, 130 is currently connected to WiFi, and record the current SSID for later use (step 450). At step 430 of method 400, the user uses the mobile application to scan the QR code. After successfully scanning the QR code, the mobile application displays the SSID on the screen of the mobile device 112, copies the password to a clipboard, and reminds the user to go to Settings on the mobile device 112 to connect to the network with the given SSID and paste the password. At step 430, the user may also navigate to Settings before returning to the mobile application after successfully connecting to the network. At step 440 of method 400, the mobile application is able to detect the camera device 110, 200, 300 has been connected and report success to users. The camera device 110, 200, 300 and the mobile device 112 are now connected through a direct WiFi link.

At step 450 of method 400, the second part of the method begins, and the mobile application determines whether the SSID recorded earlier at step 420 is in the WiFi network that the user wants the camera device 110, 200, 300 to connect. If so, the method directly proceeds to prompt for a password, otherwise, the mobile application asks the camera device 110, 200, 300 to present a list of current SSIDs, the user makes a selection from the list of current SSIDs, and the user, then, gets prompted for the password. At step 460 of method 400, the user enter a password at the mobile device 112 and selects (e.g., clicks) a "connect" option. At step 470 of method 400, the camera device 110, 200, 300 uses the client mode to connect to the home WiFi, while maintaining connection to the mobile device 112, 130 with its AP. Based on the results of the connection, a success or error messages are presented to the user on the mobile device 112, 130. At step 480 of method 400, upon success, the mobile application reminds a user that a connection has been successfully established between the camera device 110, 200, 300 and the external WiFi. Note, at this point, an external WiFi may challenge the mobile device 112, 130 for further authentication, and such challenges are forwarded from the camera device 110, 200, 300 to the mobile device 112, 130 to resolve.

Remote Control of Camera Device through the Cloud

The connected camera device 100 includes a cloud infrastructure that may remotely control the mechanical and functional aspects of the camera device 110. Through such infrastructure, users who do not have direct physical access to the camera 110, 200, 300 could remotely change the facing direction of the camera 110, 200, 300, and watch the corresponding video stream, which makes the experience more social and engaging.

For example, in some embodiment, the user of the camera device 110 first determines who may access and control the camera device 110, 200, 300 remotely, e.g. public access or a group of selected authenticated users, and configures the camera device 110 accordingly. When the camera device 110, 200, 300 is ready for opening control access to other users, the camera device 110, 200, 300 starts to stream video through the cloud infrastructure 120 of FIG. 1 and waits for incoming commands. On the remote side, an authenticated user who is granted access to control the camera device 110 may use a mobile interface through a mobile application or a web interface within a mobile/desktop browser to watch the real-time video and issue commands for directional change through a virtual remote control widget on the same interface (e.g., viewing device 130). Depending on the network setup of the camera device 110, the camera device 110, 200, 300 may receive commands for controlling its direction via a "push" or "pull" mode. In embodiments where a direct socket connection can be established between the camera device 110, 200, 300 and the remote controlling device 130, after meeting authentication requirements, the remote controlling device 130 sends commands directly to the camera device 110, 200, 300 through the socket connection (i.e., the push mode). In embodiments where such direct connection cannot be established (e.g., when the camera device 110 is not connected to the Internet via 4G/LTE module or WiFi), but needs to route through a connected device (e.g., mobile device 112), the remote controlling device 130 sends commands to the cloud 120 and caches the commands in a queue, and the camera device 110, 200, 300 periodically pulls commands from this queue and executes them via the one or more processors of the camera device 110, 200, 300.

Smart Streaming

The connected camera system 100 includes a cloud service infrastructure 120 for streaming visual contents through the cloud in an intelligent and adaptive manner. The cloud service infrastructure 120 functions in conjunction with the WiFi Connectivity 106 described above. Depending on the availability and quality of different types of connectivity on the device, such as WiFi or cellular connection, the device is able to adaptively adjust the streaming of video or other sensory contents with different size and compression quality, including periodic static image shots instead of videos. In the absence of direct connection to the Internet on the camera device 200, 300, the connected camera system 100 includes a software system that enables streaming through a pairing mobile device (such as 112 in FIG. 1) with Internet connectivity. The mobile device 112 establishes links to both the camera device 110, 200, 300 via WiFi and the Internet, and is able to pull contents off the camera 110, 200, 300 and stream the contents through the cloud.

Bookmark/Highlight Visual Data

The connected camera system 100 of the present invention is configured with hardware and software (e.g., algorithmic functions) to bookmark (or highlight) a video segment, or segment of other visual data, captured by the camera sensors of camera system 110, 200, 300. Such capability enables users to quickly and effectively identify, locate, and mark the most interesting video segments among lengthy raw video contents, which may be later edited, uploaded to the cloud, and shared, addressing the need that video segments of interest are often fractionally small compared to the total captured content and difficult to locate and extract.

In some embodiments, the viewing device 130 (via a mobile application) may bookmark (or highlight) the presented captured data directly on display 218, 332, 344, streamed to viewing device 130, or downloaded/stored on the viewing device 130. In the streamed captured data embodiments, the viewing device 130 transmits (stream) user-input for bookmarking/highlighting a visual data segment at the mobile application from the viewing device 130, via cloud service 120, to the camera system 200, 300, wherein the one or more processors at the camera system 200, 300 may update the display 218, 332, 344. In the embodiments where the bookmarking/highlighting is directly on the display, hardware devices may be used for bookmarking or highlighting the captured visual data. For example, a clickable button may be provided on the main body of the camera device 200, 300 or on the power cord 216, 340 for bookmarking/highlighting the captured visual data. For another example, the remote control, as described above, may be attached to the driving wheel in the car setting configured with the connected camera system 100, including camera devices 200, 300. In other embodiments, the camera devices 200, 300 may be configured with an audio/voice recognition device, which transmits a signal to the one or more processors on the camera system 200, 300 (e.g., via Smart WiFi connectivity 106) to bookmark/highlight the current captured segments of the visual data. Non-limiting examples of audio/voice commands include triggered audio recognition of predefined sound signatures, such as passengers laughing, and motion detection of particular patterns, such as sudden acceleration. Note, the camera devices 110, 200, 300 are configured to capture both visual data (e.g. image, video, and such) and other sensory data streams, including GPS, accelerometer, compass, OBD II, for a given sampling rate for bookmarking and highlighting. The highlighted/bookmarked data may be stored (recorded) at the camera devices 200, 300 in the computer memory or streamed to the viewing devices 130 to be stored (recorded) in computer memory.

Note, bookmarked/highlighted points in the captured data, placed in real-time along a time axis, are converted into short video segments according to user settings (provided via a mobile application on the viewing devices 130). These segments provide a starting basis for users' further editing, particularly length adjustment editing, via the mobile application of the viewing devices 130 (or other such application on other devices). Further, the camera devices 200, 300 and viewing devices 130 are configured with middleware that best manages and preserves bookmarks, so that the bookmarks are kept preserved on the devices 200, 300, 130 before users process them, even when the memory storage of the device is full and rotational rewriting happens. The camera device 110, 200, 300 in the present invention is capable of capturing both visual and other sensory data streams, including GPS, accelerometer, compass, OBD II for a given sampling rate. This bookmarking/highlighting ensures that the picture or video clip (individual frame or certain set/sequence of frames) is easy to locate while editing.

The connect camera system 100 includes various mechanisms or algorithms for bookmarking and highlighting a visual data segment of interest, which may be configured in the one or more processors of the camera system 200, 300 or the viewing devices 130 for execution by a mobile application. In some embodiments, the connected camera system 100 includes mechanisms, which in some embodiments may include machine learning, which automatically detects pre-defined events configured at the connected camera system 100. For example, the predefined events may be configured in the computer memory of the camera device 110, computer memory of the connecting devices 130, or in a database accessible to the cloud service 120. The one or more processors of the camera device 110 or connecting devices 130 may be configured to reference these predefined events, such as in its computer memory or via the cloud service 120, and to automatically bookmark/highlight the associated data of interest to a user (e.g., pictures, videos, and such) when one of these pre-defined events occur during the capturing or displaying of the visual data. Further, the mechanisms may identify interesting data (e.g., pictures, videos, GPS reading, accelerometer reading, etc.) based on learning a user's previous selection during highlighting/bookmarking or editing, and store indications of the interesting data that corresponds to the previous selections as a predefined event for later referencing by the connected camera system 100. Additionally, sensors configured in the connected camera system 100 may be programmed to detect predefined events (e.g., at certain thresholds, parameter values/ranges, and the like of a GPS, accelerometer, lighting sensors, and such) of the images and video clips. The sensors may then transmit an indication to the one or more processors of the camera device 110 to automatically bookmark/highlight the visual data being captured or displayed at the time of the detected condition. In some embodiments, when one of the predefined events (detected threshold conditions) occurs, the camera device 110 automatically inserts a bookmark/highlight into its current captured visual data (recording) without the user's manual action. The range and thresholds mentioned above could either be pre-defined by each individual user, or preset by the system through aggregated user preference learned by the cloud infrastructure 120. In some embodiments, the user may also manually insert bookmarks/highlighting into captured visual data, such as via the remote control or a mobile application executing on the controlling/viewing devices 112, 130.

The automatic bookmarking/highlighting may be triggered by events that include: GPS coordinates of the event falling into a predefined range, speed (e.g., of a car in which the connected camera system 100 is installed), as from data detected by an OBD II connection, exceeds a certain threshold, acceleration (e.g., of a car in which the connected camera system 100 is installed), as from data detected by an accelerometer, exceeds a certain threshold along a particular axis, and angles of the camera device's 110 absolute orientation, such as pitch and roll angles, exceed certain thresholds.

In some embodiments, the connected camera system 100 includes additional algorithms used to automatically highlight interesting data (e.g., pictures, videos, GPS reading, accelerometer reading, etc.) if the data are captured within a defined area near a point-of-interest. Points of interest may be identified and defined using $3^{rd}$ party databases such as Google Maps. Example points of interest may include but are not limited to bridges, tunnels, scenic overlooks, ocean front roads, etc. Points of interest may also be identified and defined through machine learning of where other users have taken or manually highlighted images and video in the past. Similar to the above algorithms/mechanisms, the one or more processors of the camera device 110 or connecting devices 112, 130 may be configured to reference the 3$^{rd}$ party databases, such as via the cloud service 120 and WiFi connectivity 106, and to automatically bookmark/highlight the associated data of interest to a user (e.g., pictures, videos, and such) when one of these points-of-interest occurs during the camera device 110 capturing or displaying of the visual data. The auto highlight functionality may also automatically rotate the camera direction to the direction of the point-of-interest. Furthermore, embodiments of the present invention have the ability to continuously update its point-of-interest data through its wireless connection to the cloud.

In some embodiments, the sensors configured in the connected camera system 100 includes an accelerometer that detects acceleration or a series of accelerations used to trigger automatically bookmarking/highlighting interesting data (e.g., pictures, videos, GPS state, accelerometer reading, etc.) during the capturing or displaying of visual data. One example application includes, but is not limited to, detecting accelerations from a bumpy road or from a curvy mountain road that trigger embodiments of the present invention to automatically highlight data (e.g., pictures, videos, GPS state, accelerometer reading, etc.) captured at that location.

Further, in some embodiments, the connected camera system 100 may similarly use a microphone as a sensor that triggers automatic bookmarking/highlighting of interesting data (e.g., pictures, videos, GPS state, accelerometer reading, etc.) during the capturing or displaying of visual data. The microphone can also trigger the camera of the present invention to rotate in a specific direction. An example application includes but is not limited to the present invention's microphone detecting laughter triggering the camera lens to turn towards the laughter and highlight the data (e.g., pictures, videos, GPS reading, accelerometer reading, etc.) being recorded at that time. Alternative embodiments of the present invention may use hand gestures as a trigger to rotate the camera and auto highlight interesting data (e.g., pictures, videos, GPS reading, accelerometer reading, etc.). In some embodiments, the connected camera system 100 includes may also employ image recognition technology to similarly detect objects of interest and highlight data (e.g., pictures, videos, GPS reading, accelerometer reading, etc.) during the time the object of interest was recorded. An example application includes, but is not limited to, detecting road signs, such as but not limited to US State welcome signs, while traveling in an automobile. Further, the auto highlight functionality of the present invention may also automatically switch on from sleep mode to recording mode.

All data sources (image, video, GPS, accelerometer, OBD II, etc.) from the present invention may be recorded and saved during a highlighted event in the computer memory of the camera devices 200, 300 or at the viewing devices 112, 130. Furthermore, the highlighted event may include an adjustable period of time to highlight data both before and after the event is triggered. This counts for both manually triggered highlight events and automatically triggered highlight events. In some embodiments, bookmarking could also be triggered automatically and intelligently without a human's physical intervention, which will be described in later sections.

The advantages of the connected camera system 100 include, without limitation, a simplified method for recording a road trip from the automobile. The systems and methods of the present invention simplify recording views of all horizontal 360 degrees around the vehicle. The auto highlight capability allows the vehicle's driver and passengers to capture by video (camera) all interesting parts of the trip automatically. The multiple sources of data, i.e., GPS, OBD II, accelerometer, add additional contextual information to the camera recorded video (visual data).

Example Bookmarking Based on GPS Event

Figure 4B:
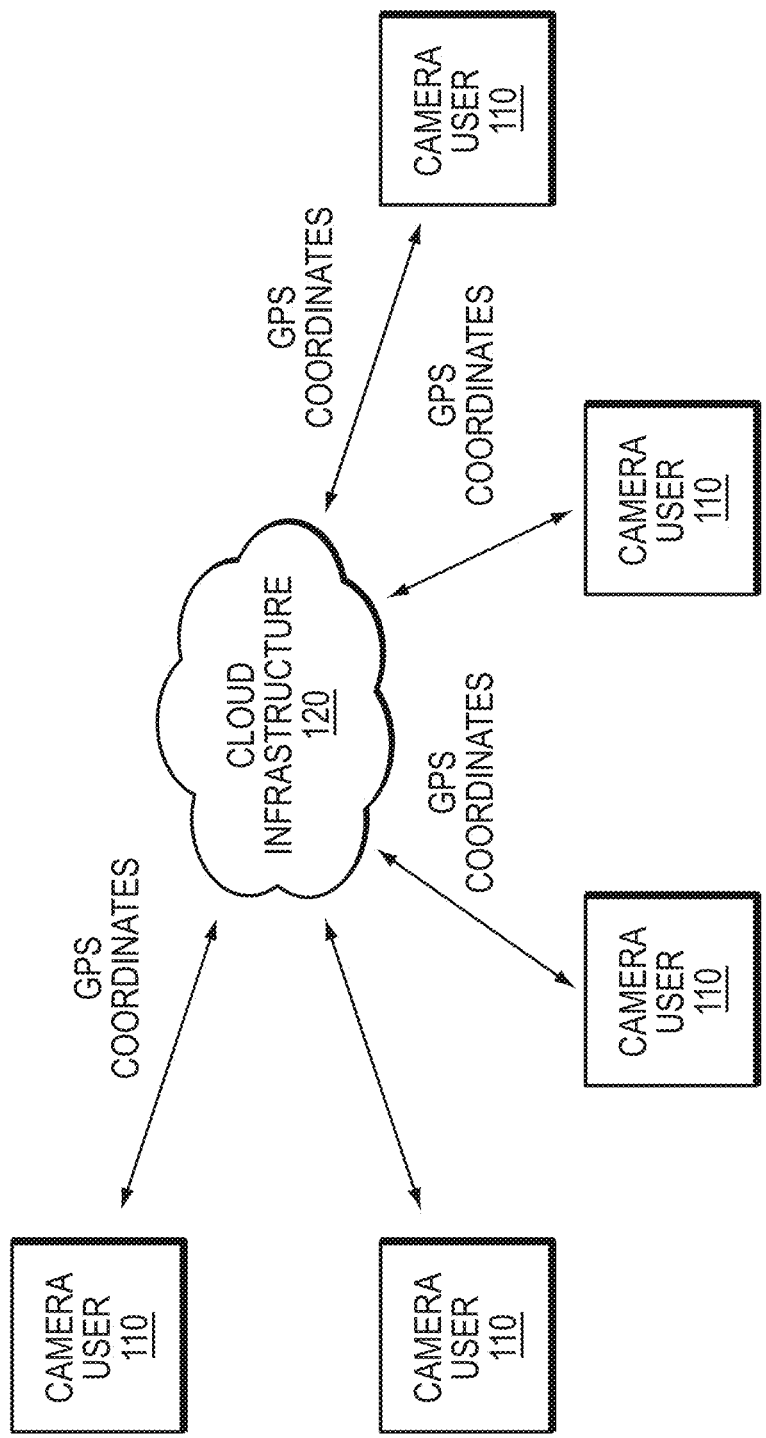
FIG. 4B is an example schematic diagram of example bookmarking based on GPS coordinates in embodiments of the present invention.

FIG. 4B illustrates an example method of bookmarking/highlighting captured visual data (e.g., image, video, and such) in embodiments of the present invention. FIG. 4B shows camera users of camera devices 110 (e.g., in some embodiments may be mobile device 112 or viewing devices 130, or specifically camera devices 200, 300), which is configured with GPS sensors configured to transmit GPS coordinates of manual bookmarks. For example, the GPS sensors are configured with predefined events comprising GPS coordinates of points of interests falling into a predefined range of geofences. The cloud service 120 aggregates the GPS coordinates of the manual bookmarks entered from the population of camera system 100/devices 110 users to synthesize the list of best points of interests worth highlighting as a list of geofences. A particular camera device 110 references the GPS coordinates at the cloud service 120 (e.g., in a database), and when that camera device 110 enters one of the list of geofences (e.g., the car installed with the camera device 110 enters one of the list of geofences), the camera device 110 automatically bookmarks the visual data being captured or being displayed.

Edit Visual Data

Figure 5A:
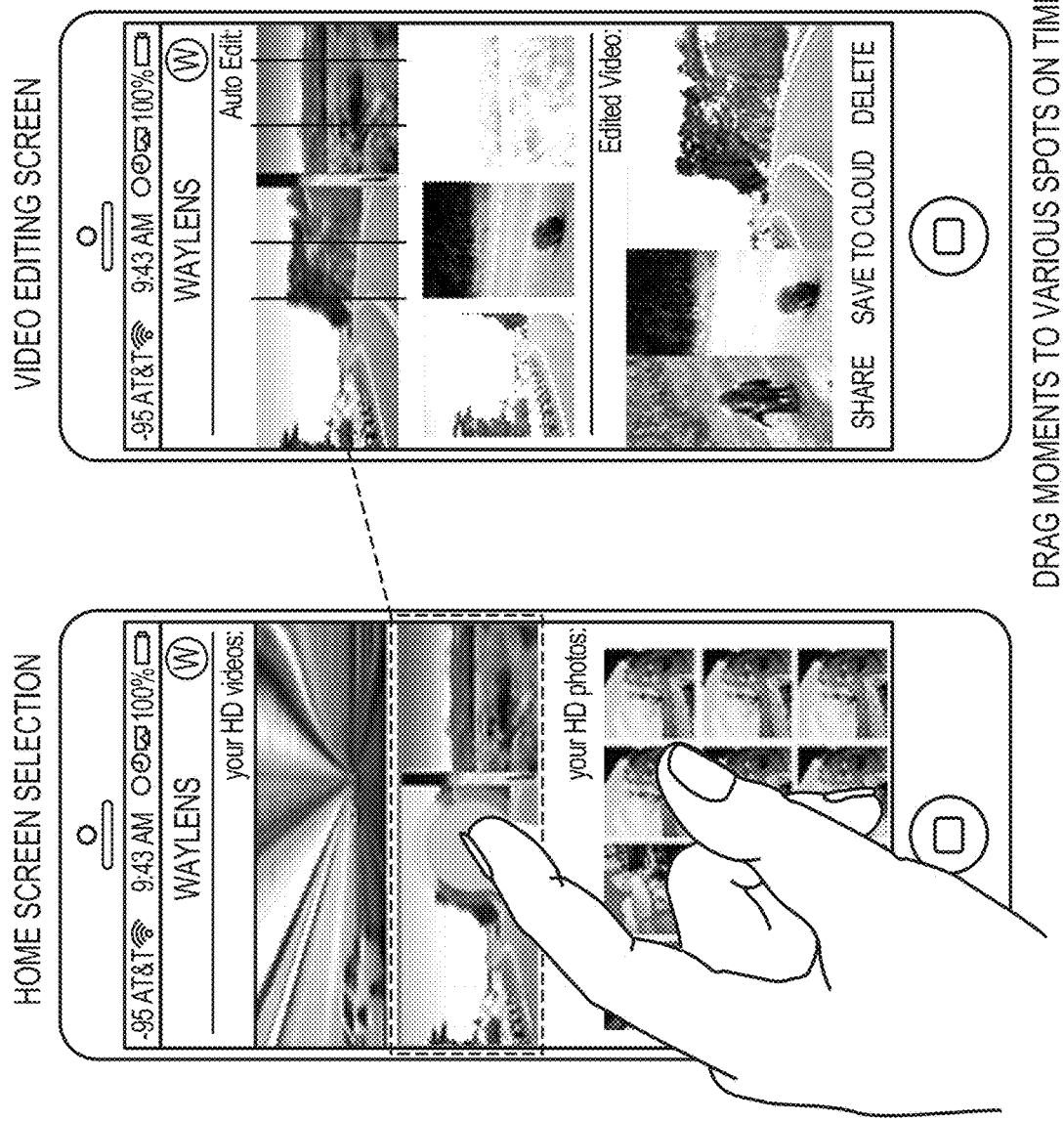

The present invention includes a mobile application to allow for quick editing of captured video from the viewing devices 130 of the connect camera system 100. The mobile applications, shown in FIGS. 5A-5C, are examples of mobile application user interfaces and user experiences for the user to view and edit captured visual data. In some embodiments, these mobile applications may be used to edit the visual data at the camera system 200, 300, by the camera device 200, 300 streaming the visual data to the viewing devices 130. In other embodiments, the visual data is downloaded (or recorded) to the viewing devices 130 for editing. FIGS. 5A-5C provide only non-limiting examples of designs of the mobile application (the mobile application is not limited to the description or images below.)

FIG. 5A below illustrates an example home screen (on the mobile application) displaying the library of bookmarked videos and photos captured by the camera device 200, 300. The described algorithms for bookmarking/highlighting the raw video footage on the camera devices 200, 300 allows the mobile application to present the most interesting and worthwhile clips (image or video segments) to users, so that the user saves time in identifying and locating such clips in the visual data, and can make fast decisions on how to edit and share such clips (e.g., on the cloud 120).

As shown in FIG. 5A, on the left, the "home screen" of the mobile application displays a video (at the top) and segments of visual data (i.e., a video) that was previously bookmarked/highlighted by a user (at the bottom). The user selects one of the segments (i.e., clips) in the home screen, and the mobile application displays the "video editing screen" with the selected clip automatically split into main focused moments (which may be played on repeated .gifs/time lapses in the mobile application), which the user may swipe over or otherwise scroll to review. The mobile application selects and splits the selected clip into these moments based on determining changes in the background, camera focus, or any other configured characteristic of the visual data. The mobile application, the "video editing screen," enables the user to drag moments to various locations on the timeline (shown at the button of the edit screen) to edit the sequence of the moments. Further, the mobile application enables the user to highlight, and, then swipe (scroll), specific displayed moments, or using the delete button, to delete that specific moment from the clip. In this way, a visual data (e.g., a video) can be easily trimmed down by the user. The video can then be shared (using the shown "share" button) to any social media platform, e.g., Facebook, twitter, Pinterest, Instagram, and the like, or stored (e.g., on the viewing device 130 or in the cloud 120). Videos and photos from other sources (such as but not limited to images and videos from a smartphone's camera, Dropbox folder, Google drive folder, GoPro or other action CAM, DSLR CAM, etc.) can be also added to the current clip being edited, using the "add" button (not shown). The updated clip may be saved locally to the viewing device 130 or the "save to cloud" button may be selected to save the updated clip on the cloud 120.

FIG. 5B shows an alternative embodiment of the mobile application. In this example, the "home screen," at the top, shows the library of videos and photos taken on the trip in a revolving manner for the photos and scrolling manner for videos. The videos are further listed in a time lapsed manner, and the user may touch to revolve the videos around to find a video to select. The user then selects the clip to be edited, which is displayed on the "video editing/time selection screen" split according to the time intervals chosen in the center of the screen to trim the clip (using the "set" and "audio" buttons), and the clip, at the top of the screen, is edited down to specific times (user-specified time periods) of the video. By swiping the clip, at the bottom of the screen, the user may select parts of the video to keep, delete, or even share at that moment. If kept, the same process of defining time intervals is repeated to more finely define the clip, and the video keeps cascading downwards as it is edited more and more finely. The bottom of the screen constantly shows the edited clip playing in real-time as it is edited. FIG. 5C shows other "video editing screens" that the user may select for a more in-depth editing of the more finely defined clips. At any time, the video may be shared to any social media, as well as other videos/photos added to the current video to be edited by clicking the "add" button (not shown). In some embodiments, the mobile application allows the user to search recorded videos and images for key words.

Smart Time-Lapse View Generation

Time-lapse view 132 provided by the viewing devices 130 via the smart-time lapse view generation 122 of the cloud server 120 refers to the visual experience of fast-forwarding a video recording, by sampling the video at a certain rate and displaying concatenated sampled frames. In the context of playing road-trip videos recorded while driving/riding/walking along a road, time-lapse view provides an interesting visual experience of sceneries passing by quickly. A challenge that arises from creating the time-lapse view is how video should be sampled for the optimal experience The present invention includes a system and algorithms for intelligently determining variable sampling rates of original raw video, and producing a time-lapse view that provides an optimized view experience. The algorithm is based on several factors, including length of the trip covered, length of the video recorded, and such, and configurable constraints, including maximum distance covered per second, which does not cause watchers to start feeling uncomfortable, the required length of the output time-lapsed video, and requirement on visual effects, such as acceleration at the beginning and the deceleration at the end.

Digital Processing Environment

Figure 6:
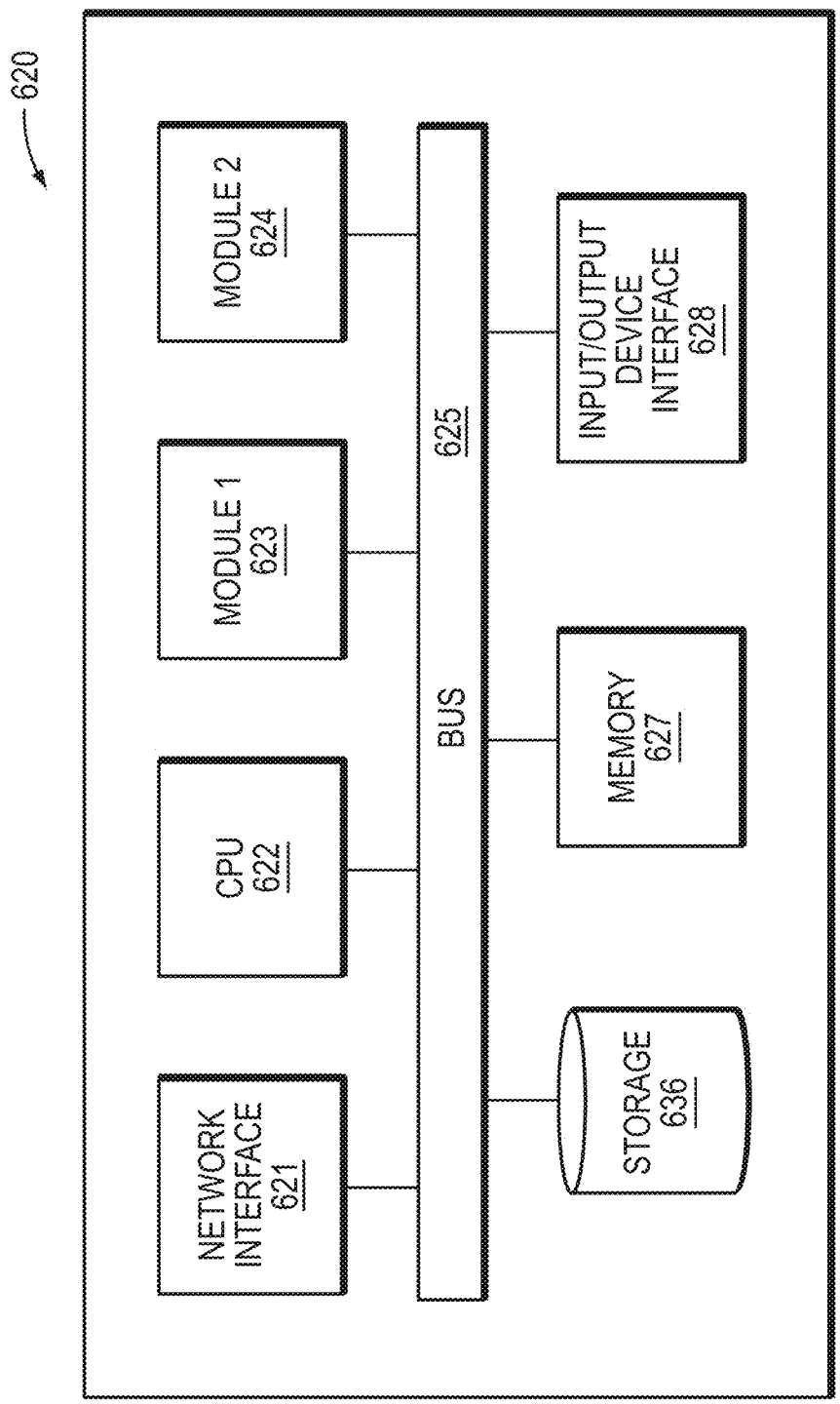
FIG. 6 is a block diagram of a computer (or digital processing) system for controlling a camera device in at least one embodiment of the present invention.

FIG. 6 is a simplified block diagram of a computer-based system 620 that may be used to control a camera system 100 according to an embodiment of the present invention. The system 620 comprises a bus 625. The bus 625 serves as an interconnector between the various components of the system 620. Connected to the bus 625 is an input/output device interface 628 for connecting various input and output devices such as a keyboard, mouse, display, touch screen overlay, speakers, camera, etc. to the system 620. A central processing unit (CPU) 622 is connected to the bus 625 and provides for the execution of computer instructions. Memory 627 provides volatile storage for data used for carrying out computer instructions. Storage 636 provides non-volatile storage for software instructions, such as an operating system (not shown). In particular, memory 627 and/or storage 636 are configured with program instructions implementing methods for providing camera device controls detailed in FIG. 1. The system 620 also comprises a network interface 621, such as the smart WiFi Connectivity interface 106 of FIG. 1 for connecting to any variety of networks known in the art, including cloud, wide area networks (WANs) and local area networks (LANs).

Further connected to the bus 625 is a first module 623. The first module 623 is configured to process commands for controlling a camera device (e.g., camera devices 110, 200, and 300 of FIGS. 1-3) capturing visual data. The first module 623 may receive control commands from any means known in the art. For example, the first module 623 may retrieve programmed control commands stored on the storage device 636 or memory 627. For further example, the first module 623 may receive control commands from mobile devices from any point communicatively coupled to the system 620 via the network interface 621 and/or input/output device interface 628.

The system 620 further comprises a second module 624 that is communicatively/operatively coupled to the first module 623. The second module 624 is configured to display visual data captured by the camera sensors of the camera device (e.g., camera device 110, 200, and 300 of FIGS. 1-3). The second module 624 may display the captured visual data through any means known in the art. For example, the second module 624 may retrieve recorded captured visual data from the storage device 636 or memory 627. For another example, the second module 624 may stream the captured visual data in real-time to the display 628 by CPU 622 via the bus 625. For further example, the second module 624 may stream the visual data to any point communicatively coupled to the system 620 via the network interface 621.

It should be understood that the example embodiments described herein may be implemented in many different ways. In some instances, the various methods, systems, and devices described herein may each be implemented by a physical, virtual, or hybrid general purpose computer, such as the computer system 620 of FIG. 6. The computer system 620 may be transformed into the machines that execute the methods described herein, for example, by loading software instructions into either memory 627 or non-volatile storage 636 for execution by the CPU 622. Further, while the first module 623 and second module 624 are shown as separate modules, in an example embodiment these modules may be implemented using a variety of configurations.

The system 620 and its various components may be configured to carry out any embodiments of the present invention described herein. For example, the system 620 may be configured to carry out the methods described hereinabove in relation to FIGS. 1, 2, 3, and 4. In an example embodiment, the first module 623 and second module 624 may be implemented in software that is stored on the memory 627 and/or storage device 636. In such an example embodiment, the CPU 622 and the memory 627 with computer code instructions stored on the memory 627 and/or storage device 636 implement a first module that controls a camera device capturing visual data. Further, the components of the system 620 implement a second module that is operatively coupled to the first module and configured to display the captured visual data.

Figure 7:
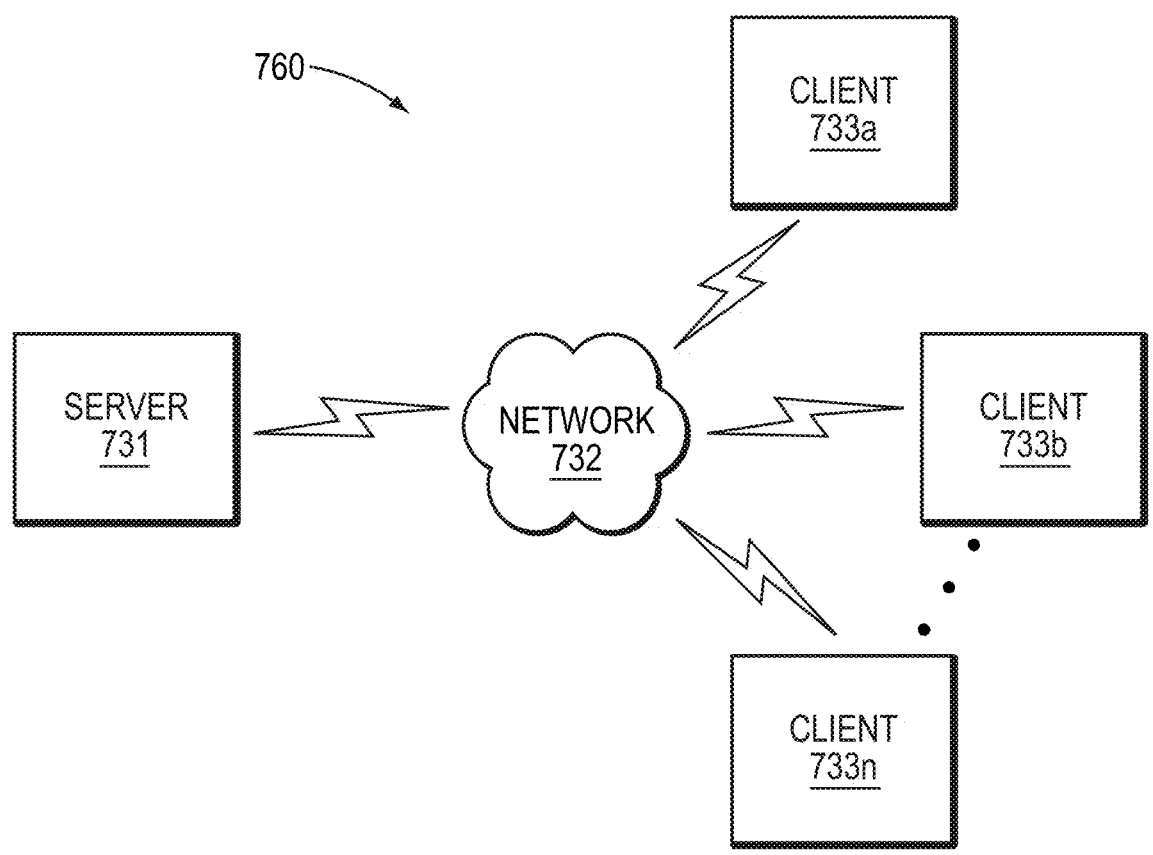
FIG. 7 is a schematic diagram of an example computer network environment in which embodiments of the present invention may be implemented.

FIG. 7 illustrates a computer network environment 760 in which an embodiment of the present invention may be implemented. In the computer network environment 760, the server is linked through the communications network 732 to the clients 733a-n. The environment 760 may be used to allow the clients 733a-n, alone or in combination with server 731 to execute any of the methods described hereinabove (e.g., methods executed by the components of FIGS. 1-4). The environment 760 may comprise the connected computer system 100 of FIG. 1. It should be understood that the example embodiments described above may be implemented in many different ways. In some instances, the various methods and machines described herein may each be implemented by a physical, virtual, or hybrid general purpose computer, or a computer network environment such as the computer environment 760.

Embodiments or aspects thereof may be implemented in the form of hardware, firmware, or software. If implemented in software, the software may be stored on any non-transient computer readable medium that is configured to enable a processor to load the software or subsets of instructions thereof. The processor then executes the instructions and is configured to operate or cause an apparatus to operate in a manner as described herein.

Further, firmware, software, routines, or instructions may be described herein as performing certain actions and/or functions of the data processors. However, it should be appreciated that such descriptions contained herein are merely for convenience and that such actions in fact result from computing devices, processors, controllers, or other devices executing the firmware, software, routines, instructions, etc.

It should be understood that the flow diagrams, block diagrams, and network diagrams may include more or fewer elements, be arranged differently, or be represented differently. But it further should be understood that certain implementations may dictate the block and network diagrams and the number of block and network diagrams illustrating the execution of the embodiments be implemented in a particular way.

Accordingly, further embodiments may also be implemented in a variety of computer architectures, physical, virtual, cloud computers, and/or some combination thereof, and, thus, the data processors described herein are intended for purposes of illustration only and not as a limitation of the embodiments.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

The teachings of all patents, published applications and references cited herein are incorporated by reference in their entirety.

While this invention has been particularly shown and described with references to example embodiments thereof, it will be understood by those skilled in the art that various changes in form and details may be made therein without departing from the scope of the invention encompassed by the appended claims.

What is claimed is:

1. A connected camera system for processing visual data, the system comprising:
a camera device configured with a camera housing, the camera housing comprising a camera sensor that captures the visual data in view of a lens; the camera device further configured with a processor capable of implementing mobile applications a mobile device configured with a mobile application for generating control data for the camera device and wirelessly transmitting the control data to the camera device; and the camera configured to receive the control data, and, based on the received control data capture the visual data in view of the lens, the camera wirelessly transmitting visual data captured from the camera sensor directly to the mobile device, the mobile device configured to receive the captured visual data, edit the captured visual data, and forward the captured visual data or an edited version thereof to a cloud service located remotely from the mobile device.

2. The system of claim 1, wherein the visual data comprises at least one of image or video.

3. The system of claim 1, wherein the camera device is further configured with a motor for rotating a shaft and camera housing and the processor is further coupled to one or more sensors, wherein the processor rotates the shaft based on conditions detected by the one or more sensors.

4. The system of claim 3, wherein the sensors include at least one of a GPS, accelerometer, automotive on board diagnostic connections (ODB II), G force sensor, and altimeter.

5. The system of claim 1, wherein the processor is further coupled to a display, such that the processor presents the captured visual data on the display.

6. The system of claim 1, wherein the control data is provided from a remote control device.

7. The system of claim 1, wherein the processor is configured to stream the captured visual data to the mobile device.

8. The system of claim 7, wherein the mobile device provides context-aware viewing of the streamed captured data.

9. The system of claim 7, wherein the mobile application bookmarks, highlights, and edits at least one of the captured data presented on the display or the streamed captured visual data at the mobile device.

10. The system of claim 9, wherein the cloud service provides at least one of smart time-lapse view generation or smart highlight video generation for editing the captured data.

11. A method for processing visual data, the method comprising: providing control data to a mobile application of a mobile device; wirelessly transmitting, from the mobile device, the control data to a camera device; processing the received control data at the camera device, wherein the control data controls camera device such that a camera sensor captures visual data in view of a lens; wirelessly transmitting captured visual data from the camera device directly to the mobile device; editing the captured visual data in the mobile device; and forwarding the captured visual data or an edited version thereof to a cloud service located remotely from the mobile device.

12. The method of claim 11, wherein the visual data comprises at least one of image or video.

13. The method of claim 11, further comprising rotating the camera housing based on conditions detected by one or more sensors.

14. The method of claim 13, wherein the sensors include at least one of a GPS, accelerometer, automotive on board diagnostic connections (ODB II), G force sensor, and altimeter.

15. The method of claim 11, further comprising displaying the captured visual data on a display.

16. The method of claim 11, wherein the control data is provided from a remote control device.

17. The method of claim 11, further comprising streaming the captured visual data to the mobile device.

18. The method of claim 17, wherein context-aware viewing is applied to the streamed captured data.

19. The method of claim 17, further comprising bookmarking, highlighting, and editing at least one of the displayed captured data and the streamed captured visual data at the mobile device.

20. The system of claim 19, further comprising providing, at the cloud service, at least one of smart time-lapse view generation or smart highlight video generation for editing the captured data.

\* \* \* \* \*